United States Patent [19]

Tamada et al.

[11] Patent Number: 4,739,479
[45] Date of Patent: Apr. 19, 1988

[54] APPARATUS FOR INPUTTING CLASSIFICATION INFORMATION OF DELIVERY MATTER

[75] Inventors: Masuo Tamada, Yokohama; Kazuhito Haruki, Kawasaki; Kimio Katsuragawa, Tokyo, all of Japan

[73] Assignee: Kabushiki Kaisha Toshiba, Kawasaki, Japan

[21] Appl. No.: 88,522

[22] Filed: Aug. 21, 1987

Related U.S. Application Data

[63] Continuation of Ser. No. 737,656, May 24, 1985, abandoned.

[30] Foreign Application Priority Data

Sep. 17, 1984 [JP] Japan ................................ 59-192697

[51] Int. Cl.⁴ .............................................. G06K 9/00
[52] U.S. Cl. .................................... 364/409; 209/900; 209/939; 382/11
[58] Field of Search .............. 364/409; 382/57, 10–12; 209/584, 900, 939

[56] References Cited

U.S. PATENT DOCUMENTS

| | | | |
|---|---|---|---|
| 4,158,835 | 6/1979 | Miura | 382/57 |
| 4,254,875 | 3/1981 | Varhelyi | 209/900 |
| 4,343,243 | 8/1982 | Gentry | 101/96 |
| 4,601,394 | 7/1986 | Hutner | 209/584 |

FOREIGN PATENT DOCUMENTS 5992077 5/1984 Japan .

OTHER PUBLICATIONS

*Electronics*, "Mail Sorting System Reads Typed Addresses and Verifies Zip Codes", Dec. 21, 1978, pp. 60–61.

Primary Examiner—Jerry Smith
Assistant Examiner—Gail O. Hayes
Attorney, Agent, or Firm—Cushman, Darby & Cushman

[57] ABSTRACT

An apparatus for inputting classification information of delivery matter comprises a display section into which postal matter is conveyed and which shows an address of each postal matter to the operator and a keyboard to input a zip code corresponding to the address displayed, and which apparatus converts the zip code inputted into a bar code and print this bar code on the postal matter. This apparatus further comprises a first storage section to store the zip codes corresponding to a plurality of states which are derived by dividing the whole region where the postal matter is delivered, a second storage section to store the zip codes corresponding to a plurality of cities that are obtained by dividing the state, a third storage section to store the zip codes corresponding to a plurality of towns that are obtained by dividing the city, and a CRT display section to sequentially display the zip codes stored in the first, second and third storage sections.

7 Claims, 5 Drawing Sheets

```
X1   STATE   12
X2   STATE   13
 .     .     .
 .     .     .
XN   STATE   99
```

```
(X1  STATE   12)
 Y1   CITY   23
 Y2   CITY   34
  .    .      .
  .    .      .
 YN   CITY   99
```

F I G. 7A
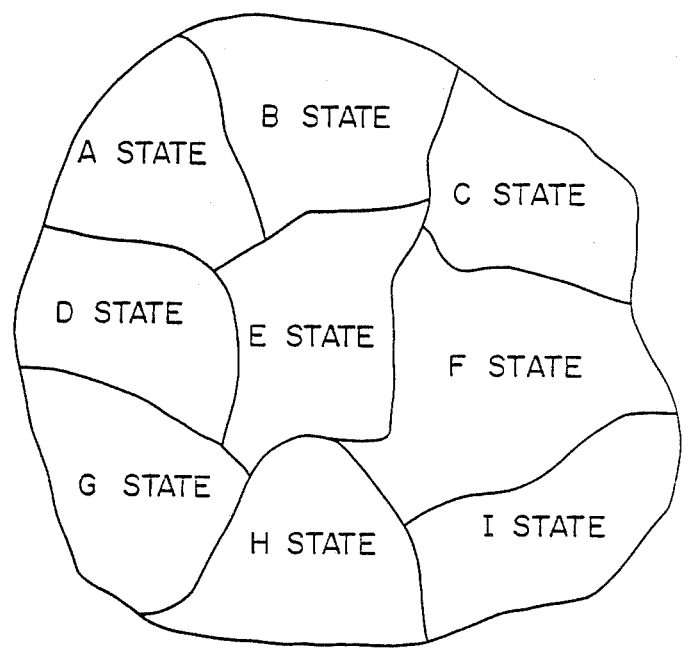
F I G. 7B
| A STATE (12) | B STATE (13) | C STATE (14) |
|---|---|---|
| D STATE (15) | E STATE (16) | F STATE (17) |
| G STATE (18) | H STATE (19) | I STATE (20) |

APPARATUS FOR INPUTTING CLASSIFICATION INFORMATION OF DELIVERY MATTER

This is a continuation of application Ser. No. 737,656 filed May 24, 1985 which was abandoned upon the filing hereof.

BACKGROUND OF THE INVENTION

The present invention relates to an apparatus for inputting classification information for postal, cargo, home delivery, and internal office delivery matter, etc.

Generally, a zip code is written at a predetermined position on a postal matter, for automatic classification by optically reading this code using an optical character reader. In practice, the large classification regarding the state is first performed and thereafter the middle classification with respect to the city in that state, the small classification relative to the town in that city, and the like are sequentially executed. In other words, each region is represented like a tree consisting of a plurality of stages of different levels. Therefore, the classification system has been developed in which the zip code is first read by the optical character reader and then the classification information such as a zip code is printed as a bar code on the postal matter. The middle and the following classifications are executed based on the read out bar code, thereby improving the efficiency of the classification process and lowering the cost of classification.

In such a system, for the postal matter on which the zip code was written and the zip code was read by the optical character reader, this read zip code or the information relative thereto is also printed as a bar code. When, however, no zip code is written on the postal matter or the zip code cannot be read by the optical character reader, the operator must input the classification information. To cope with the above problem, a system was partially used in which the classification information is input by the operator using the dedicated input apparatus called a coding desk, this information is printed as a bar code. In this case, the operator must memorize the postal codes of the whole region where the postal matter is to be delivered or at least to be able to quickly find the postal code from the address of the postal matter by referring to a postal code table. Therefore, in the conventional system, it is required to train professional operators and there is the drawback that the input processing speed depends upon the degree of skill of the operator. In addition, operator fatigue is a serious problem and it is difficult to efficiently perform the inputting process.

SUMMARY OF THE INVENTION

It is an object of the present invention to provide an apparatus for inputting classification information of delivery matter in which the burden of the operator is reduced and the classification information can be efficiently inputted.

According to the present invention, the following apparatus for inputting classification information of delivery matter is provided.

An apparatus for inputting classification information of delivery matter comprising first means for storing the first classification information corresponding to a plurality of first districts which are derived by dividing the region where the delivery matters are classified, second means for storing the second classification information corresponding to a plurality of second districts that are obtained by dividing the first district, means for displaying a part of or all of the classification information stored in the first and second means, means for inputting a part of or all of the classification information displayed by the display means, and means for providing the classification information inputted by the input means on the delivery matter.

BRIEF DESCRIPTION OF DRAWINGS

FIGS. 7A and 7B are diagrams showing another example of the display in the CRT display section in the coding desk unit or video coding desk unit.

DETAILED DESCRIPTION OF THE PREFERRED EMBODIMENTS

Figure 1:
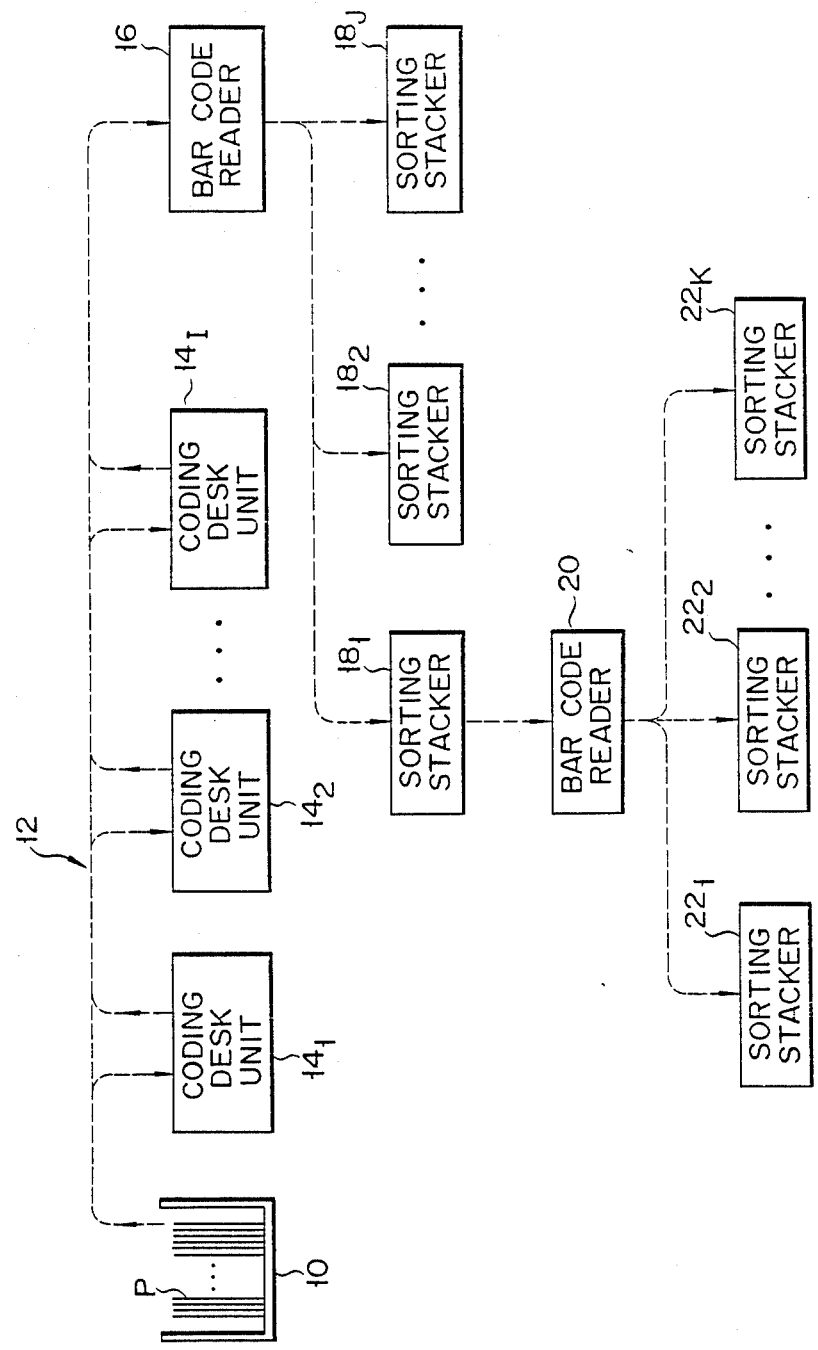
FIG. 1 is a block diagram of an overall postal matter classifying system using coding desk units as the first embodiment of an apparatus for inputting classification information of delivery matter according to the present invention.

One embodiment of an apparatus according to the present invention will be explained with reference to the drawings. FIG. 1 is a block diagram of an overall postal matter classifying system using the first embodiment of an apparatus for inputting classification information of delivery matter according to the present invention. Postal matter P for which the classification information has to be inputted because it is impossible to read their classification information by an optical character reader because no classification information written is set into a supply section 10. The setting of these postal matter into the supply section 10 may be performed in a manner such that the postal matter that are determined to be impossible to read their zip codes by another system including the optical character reader are automatically sorted into the supply section 10, or in a manner such that the operator selects the postal matter on which no zip code is written by observing them with the eye.

The supply section 10 takes out the set postal matter one by one and supplies them to a conveying path 12 (indicated by a broken line in the diagram). The conveying path 12 comprises conveying rollers, conveying belts and the like (not shown). A number of coding desk units $14_1$ to $14_I$ each for coding the classification information into a bar code and printing it on the postal matter, which is one embodiment of the apparatus for inputting classification information of delivery matter according to the present invention, are connected in the halfway portions of the conveying path 12. Each postal matter is supplied to either one of the coding desk units 14. This is because in this system it is intended that a number of operators simultaneously perform the inputting process. However, it is not always necessary to install a plurality of coding desk units 14; single coding desk unit may also be used. The postal matter may be periodically supplied to the respective coding desk units 14. Or, the processing conditions of the operators who are operating the respective coding desk units 14 are controlled by a control section (not shown) and under this control, the postal matter is always supplied to the optimum coding desk unit 14 in accordance with the processing capability of the operator. The postal matter on which the classification information was printed as a bar code by the coding desk unit 14 is returned to the conveying path 12 and is conveyed to a bar code reader 16. The postal matter may be manually transferred to the bar code reader 16 by the operator. The postal matter whose classification information (bar codes) was read by the bar code reader 16 is first roughly sorted into first sorting stackers $18_1$ to $18_J$. The postal matter sorted into the respective first sorting stackers 18 is further transported to a bar code reader 20 and is sorted into second sorting stackers $22_1$ to $22_K$ relative to fine divisions. Further, third, fourth, . . . sorting stackers are provided as necessary after the second sorting stackers 22, thereby allowing the classification to be made finer. Namely, the bar code reader 20 reads classification information in a finer division than that by the bar code reader 16.

Figure 2:
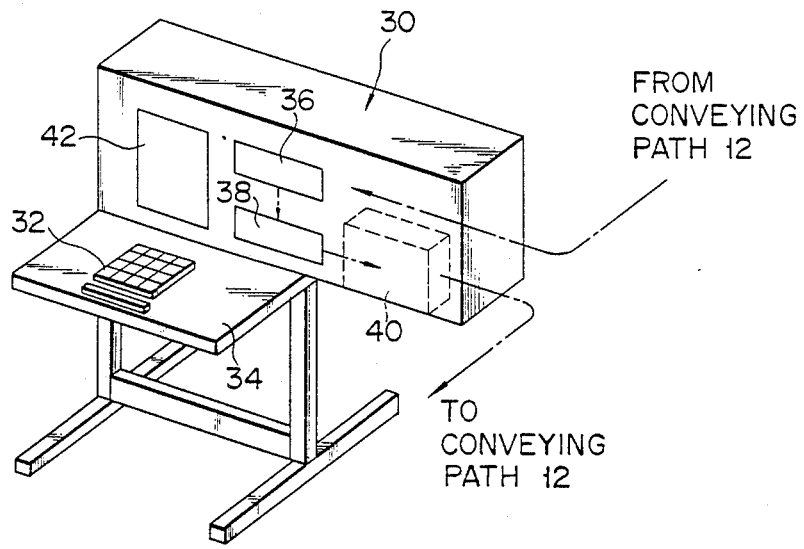
FIG. 2 is a perspective view of the coding desk unit as the first embodiment of the apparatus for inputting classification information of delivery matter according to the invention which is used in the system of FIG. 1.
Figure 3:
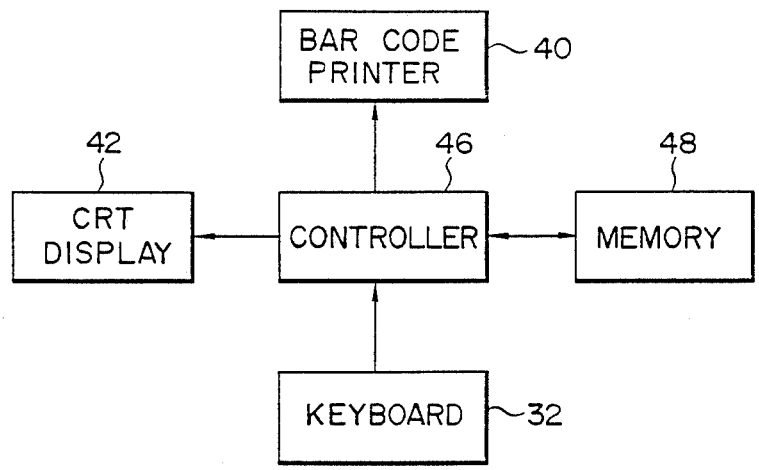
FIG. 3 is a block diagram of a control circuit in the first embodiment.

The coding desk unit 14 in FIG. 1 will now be described in detail with reference to FIGS. 2 and 3. FIG. 2 is an external perspective view and FIG. 3 is a block diagram of a control circuit. As shown in FIG. 2, the coding desk unit comprises a main body 30 and a desk 34 on which the main body 30 is placed and has a keyboard 32 to input the classification information, such as a zip code. As shown by an alternate long and short dash line, the postal matter is conveyed from the conveying path 12 into the main body 30 and pass through a pre-display section 36, a main display section 38 and a bar code printer 40 and are again sent out to the conveying path 12. The pre-display section 36 and main display section 38 are merely the windows formed in the front panel of the housing of the main body 30. When each postal matter being conveyed comes in the positions of the windows of the pre-display section 36 and main display section 38, it is temporarily stopped. Thus, the operator can read the address through the windows. In this way, the operator can simultaneously see two pieces of postal matter. When one piece of postal matter is displayed in the main display section 38, the next piece is displayed in the pre-display section 36. Therefore, the operator preliminarily observes the address of the next postal matter which is displayed in the pre-display section 36 during the inputting process of the classification information of the postal matter displayed in the main display section 38, thereby increasing the efficiency of the inputting process. This pre-display section 36 may not be provided. A CRT display section 42 for displaying the zip code corresponding to the name of the region as will be explained later is also provided in front of the main body 30.

As shown in FIG. 3, for the control circuit in each of the coding desk units 14, a classification information storage memory 48 is connected to a controller section 46 consisting of a CPU and data in the memory 48 is read out in response to an instruction from the keyboard 32 and is displayed in the CRT display section 42. At the same time this data is printed on the postal matter by the bar code printer 40. The zip codes for every region have been stored in the classification information storage memory 48. The zip codes are stored in the memory 48 for every district of which the region where the postal matter is delivered is divided like a tree into the districts of different levels. Practically speaking, the whole region is first largely divided with respect to the state, each state is further divided with regard to the city, and each city is further finely divided with respect to the town, and the zip codes are stored for every divided district.

Figures 4A, 4B, 5:
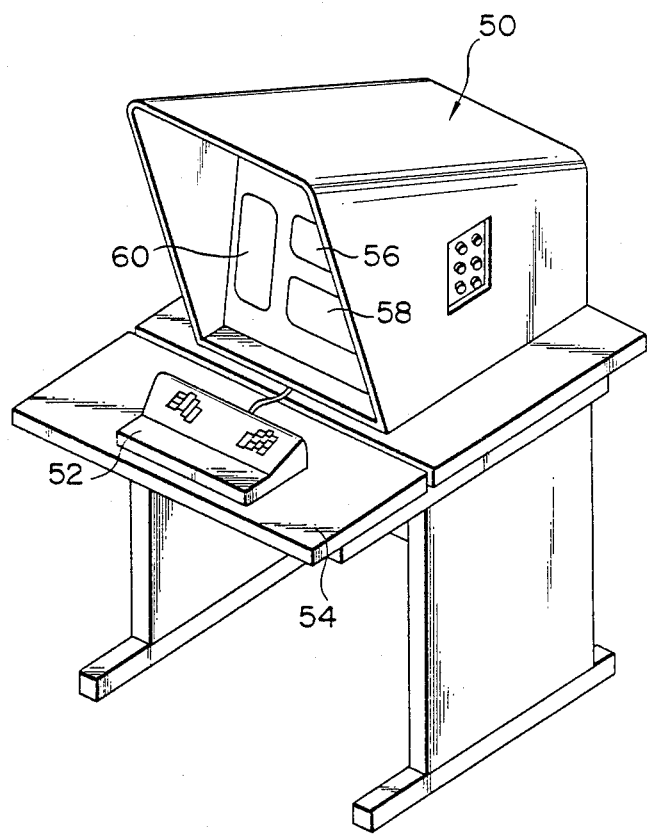
FIGS. 4A and 4B are diagrams showing one example of the display in a CRT display section in the first embodiment, respectively.
FIG. 5 is a perspective view of a video coding desk unit as the second embodiment of the apparatus for inputting classification information of delivery matter according to the invention.

The operation of the first embodiment will now be described. The controller section 46 allows the names of the states as the classification of the large division and the zip codes corresponding thereto to be read out from the memory 48 when the conveying operation is temporarily stopped in the main display section 38 after the postal matter is supplied into the coding desk unit 14 and then permits those names and zip codes to be displayed on the CRT display section 42 as shown in FIG. 4A. The operator looks at the postal matter displayed in the main display section 38 and inputs the zip code of the corresponding state from its address. The control section 46 stores the inputted zip codes and also reads out the names of the cities as the classification of the middle division in that state and the zip codes corresponding thereto from the memory 48 and switches the screen of the CRT display section 42 and allows the names of the cities and the corresponding zip codes to be displayed as shown in FIG. 4B. Further, the operator inputs the zip code of the corresponding city among those zip codes. In a similar manner, the CRT display section 42 displays the names of the further devided districts and the corresponding zip codes in accordance with the inputting of the zip codes in each division. In this way, the operator may merely input the zip codes for every district in accordance with the display on the CRT display section 42. There is no need to memorize all of the zip codes in the whole region nor to refer to the zip code table for each piece of postal matter. Therefore, the work of the operator is reduced and the classification information can be efficiently inputted. In the case where the operator is an expert and has already memorized the zip codes of the classification of large or middle division, there is no need to display the zip codes for every district of the large or middle division. As described above, the foregoing input apparatus can be freely adjusted in accordance with the capability of the operator. After completion of the inputting of the zip codes for every district, the bar code printer 40 orders the respective numerals inputted to constitute the zip code responsive to the address and then prints as a bar code. In this case, the related information such as the number of sorting stacker in the relevant region, or the like, may be printed in stead of the zip code.

As described above, according to the first embodiment, the names of the districts and the zip codes corresponding to every district are displayed on the screen and this district is sequentially fine-divided, so that the classification information can be efficiently inputted. It is unnecessary for the operator to memorize the postal codes of the whole region where the postal matter is classified, so that the drawback of the input processing speed being affected by the degree of skill of the operator is eliminated. In addition, since the research is automatically performed using the memory and the CRT display section, the burden and fatigue of the operator are small.

The second embodiment of an apparatus for inputting classification information of delivery matter according to the present invention will now be described. FIG. 5 is a perspective view of a video coding desk unit as the second embodiment. It is similar to the first embodiment in that the video coding desk unit comprises a main body 50 and a desk 54 on which the main body 50 is put and has a keyboard 52 for inputting classification information such as zip codes. However, the second embodiment differs from the first embodiment in that a pre-display section 56 and a main display section 58 consist of CRT display sections instead of mere windows and the postal matter is not actually supplied into the main body 50 but only the image signals of the postal matter picked up by image pickup means (explained later) are supplied to the main body 50 and are displayed in the display sections 56 and 58. Namely, the video coding desk unit is not connected to the conveying path of the postal matters. The main body 50 further has a CRT display section 60 which is equivalent to the CRT display section 42 in the first embodiment. Moreover, different from the first embodiment, no bar code printer is provided in the main body 50 in the second embodiment. The classification information signal inputted from the keyboard 52 is supplied to a bar code printer provided separate from the video coding desk unit.

Figure 6:
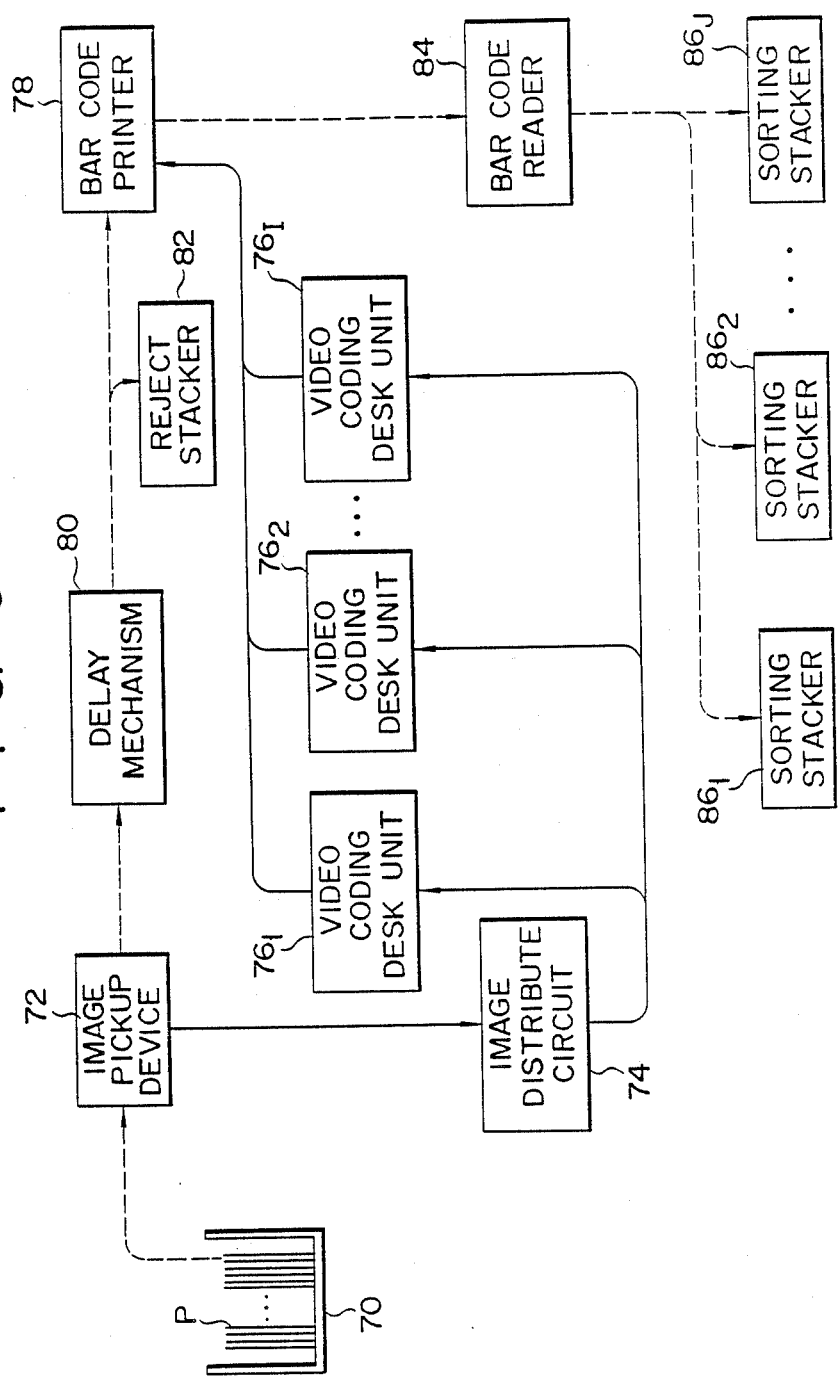
FIG. 6 is a block diagram showing a postal matter classifying system using the second embodiment shown in FIG. 5.

FIG. 6 shows a block diagram of the whole postal matter classifying system using this video coding desk unit. Postal matter P is set into a supply section 70. The postal matter taken out one by one from the supply section 70 is supplied to an image pickup device 72 formed of a CCD and the image on the surface of the postal matter on which the address is written is picked up. After completion of the image pickup, the image signal is supplied through an image distribute circuit 74 to either one of a plurality of video coding desk units $76_1$ to $76_i$. The classification information from the video coding desk unit 76 is supplied to a bar code printer 78. On the other hand, the postal matter after the image pickup is supplied through a delay mechanism 80 to the bar code printer 78 or a reject stacker 82. Each postal matter on which the classification information was printed as a bar code by the bar code printer 78 is conveyed to a bar code reader 84. The postal matter whose classification information (bar codes) was read out by the bar code reader 84 is sorted into sorting stackers $86_1$ to $86_j$. Although not shown, in a similar manner as the first embodiment, the postal matter in the sorting stacker 86 is further classified into second, third, . . . sorting stackers by the bar code reader.

As described above, according to the second embodiment, there is no need to supply each postal matter to the coding desk units and to sent it again to the conveying path after the printing of the bar code as in the first embodiment, so that the arrangement of the conveying path is simplified and the postal matter classifying system of a simple arrangement is possible. If the inputting of the classification information is delayed over the time period during which the postal matter is transmitted through the delay mechanism 80, the postal matter is sorted into the reject stacker 82. In addition, according to the second embodiment, there is no need to provide a bar code printer for every video coding desk unit so that the overall system is made cheap and simplified.

Next, a modification regarding the displays on the CRT display sections 42 and 60 in which the zip codes and names of the districts are displayed in correspondence to one another will be explained. In the case where each divided region is arranged on a map as shown in FIG. 7A, the division names and the zip codes corresponding thereto may be displayed as shown in FIG. 7B. According to this display, those names and zip codes are displayed similarly to the actual geometrical arrangement, so that the research can be further easily performed. The bar code postal information may be printed on a label in stead of on the postal matter. Attachment of this label on the postal matter results in the same effect as in the case of bar code printing on the postal matter.

As described above, according to the present invention, the zip codes for every district are displayed on the screen and this district is sequentially and finely divided. Consequently, it is unnecessary for the operator to memorize the zip codes in the whole region where the postal matter is classified and the input processing speed is not affected by the degree of skill of the operator; thus, the apparatus for inputting classification information of delivery matter which can efficiently input the classification information is provided.

What is claimed is:

1. A delivery matter classifying system comprising:
   means for conveying delivery matters with address districts of first and second levels, each of the address districts of the second level being included within one of the address districts of the first level;
   pick-up means for picking up images of the delivery matters conveyed;
   storage means for storing first codes corresponding to address districts of the first level and second codes corresponding to address districts of the second level;
   a plurality of console means each for displaying the images of the delivery matter, picked up by said pick-up means, each console means including:
   first display means for displaying the images,
   second display means for displaying the address districts of the first and second levels and corresponding first and second codes,
   input means for inputting the first and second codes, and
   second display screen control means for displaying address districts of the first level and the corresponding first codes on the second display means and, when one first code is input by said input means, for displaying a part of the address districts of the second level and corresponding second codes, that part of the address districts being included within the address district of the first level corresponding to the input first code;
   means for distributing the images of the delivery matters to said first display means of each of said plurality of console means;
   coding means, connected to said conveying means, for providing on the delivery matters the first and second codes input by said input means; and
   means, connected to said conveying means, for detecting the first and second codes which are provided on the delivery matter by said coding means, to sort the delivery matters according to the address districts.

2. A delivery matter classifying system according to claim 1, wherein said address district of the first level is a state and said address district of the second level is a city.

3. A delivery matter classifying system according to claim 1, wherein said delivery matters also have address districts of third levels, each of the address districts of the third level being included within one of the address districts of the second level;

said storage means stores third codes corresponding to address districts of the third level;

said input means inputs the third code;

said second display screen control means, when one second code is input by said input means, displays a part of the address districts of the third level and corresponding third codes, that part of the address districts belonging to the address district of the second level corresponding to the input second code; and said coding means provides the third codes on the delivery matters.

4. A delivery matter classifying system according to claim 3, wherein said address district of the third level is a street.

5. A delivery matter classifying system according to claim 1, wherein said coding means further comprises means for converting the input code into a bar code and means for printing the bar code on the delivery matter.

6. A delivery matter classifying system according to claim 1, wherein said coding means further comprises means for converting the input code into a bar code, means for printing the bar code on a label, and means for attaching the label on which the bar code is printed on the delivery matter.

7. A delivery matter classifying system according to claim 1, wherein said second display means displays the address districts and the codes at positions corresponding to geometrical locations of the address districts.

* * * * *